United States Patent
Koehler

(10) Patent No.: US 7,445,183 B2
(45) Date of Patent: Nov. 4, 2008

(54) APPARATUS WITH AXIS-PARALLEL TENSION CABLES FOR EJECTING A SPIN-STABILIZED BODY FROM A SPACECRAFT

(75) Inventor: Horst Koehler, Bremen (DE)

(73) Assignee: EADS Space Transportation GmbH, Bremen (DE)

( * ) Notice: Subject to any disclaimer, the term of this patent is extended or adjusted under 35 U.S.C. 154(b) by 525 days.

(21) Appl. No.: 11/305,429

(22) Filed: Dec. 15, 2005

(65) Prior Publication Data
US 2006/0138284 A1  Jun. 29, 2006

(30) Foreign Application Priority Data
Dec. 23, 2004 (DE) .................. 10 2004 063 115

(51) Int. Cl.
*B64G 1/22* (2006.01)
(52) U.S. Cl. .................... 244/244; 244/173.3
(58) Field of Classification Search ............. 244/173.3, 244/158.1, 63; 124/17, 18, 81, 16; 114/316, 114/318, 238–239
See application file for complete search history.

(56) References Cited
U.S. PATENT DOCUMENTS

| 2,282,315 | A | * | 5/1942 | Adams ................... 124/17 |
|---|---|---|---|---|
| 2,448,343 | A | | 8/1948 | Zandmer |
| 3,684,214 | A | | 8/1972 | Kloss |
| 3,983,783 | A | | 10/1976 | Maxey |
| 4,067,308 | A | | 1/1978 | Andersen et al. |
| 4,625,619 | A | | 12/1986 | Ceniza |
| 6,354,182 | B1 | * | 3/2002 | Milanovich ............... 89/1.818 |
| 6,672,239 | B1 | * | 1/2004 | Gieseke ..................... 114/316 |
| 2005/0045773 | A1 | | 3/2005 | Bank et al. |
| 2006/0138283 | A1 | | 6/2006 | Koehler |

* cited by examiner

*Primary Examiner*—Tien Dinh
(74) *Attorney, Agent, or Firm*—W. F. Fasse; W. G. Fasse

(57) ABSTRACT

An apparatus for ejecting a flying body (e.g. payload recovery container) from a spacecraft includes a first ring to be secured to the spacecraft, a cable winding device that is arranged on a second ring and that is releasably engageable with the flying body, and tension cables extending between the two rings. The cable winding device is spring-biased to wind-up the cables, which extend axis-parallel along the cylindrical outer shell of the flying body. Holding and guide elements on the first ring hold and guide the flying body. Catch elements on the cable winding device releasably engage receivers on the flying body. When the holding elements are released, the cables are retracted by the cable winding device, and the rotation of the cable winding device is transmitted to the flying body via the engaged catch elements and receivers. Thereby, the flying body is rotated and translationally ejected.

20 Claims, 3 Drawing Sheets

APPARATUS WITH AXIS-PARALLEL TENSION CABLES FOR EJECTING A SPIN-STABILIZED BODY FROM A SPACECRAFT

CROSS-REFERENCE TO RELATED APPLICATION

This application is related to the application entitled "Apparatus With Helical Tension Cables For Ejecting A Spin-Stabilized Body From A Spacecraft" by the same inventor and being filed on the same date as the present application. The entire disclosure of the related application is incorporated herein by reference.

PRIORITY CLAIM

This application is based on and claims the priority under 35 U.S.C. §119 of German Patent Application 10 2004 063 115.8, filed on Dec. 23, 2004, the entire disclosure of which is incorporated herein by reference.

FIELD OF THE INVENTION

The invention relates to an apparatus for ejecting a spin-stabilized space flying body from a spacecraft. The term space flying body covers any type of flying body capable of traveling in space, including spacecraft which may be propelled or unpropelled and manned or unmanned, and including containers such as payload return or retrieval containers, for example.

BACKGROUND INFORMATION

It is generally known to eject various types of space flying bodies from spacecraft, such as a space transport vehicle (e.g. the US Space Shuttle), a space station (e.g. the International Space Station-ISS), a space capsule or the like. In order to simultaneously eject and spin-stabilize the space flying body, a drive arrangement provided in the spacecraft simultaneously imposes a rotation motion and a translation motion onto the space flying body, which is thereby ejected from the spacecraft. It is generally also known to provide means for holding and for guiding the body to be ejected, relative to the spacecraft.

There is a need for ejecting spin-stabilized bodies from spacecraft in various contexts, for example as follows. In order to return test sample materials and the like from a space station (for example the International Space Station ISS) back to earth, essentially the only practical means presently available are space transport vehicles such as the US Space Shuttle. Such space transporters are also used for supply flights from the earth to the ISS, but rockets such as the ARIANE Transfer Vehicle (ATV) and the Russian Progress Capsule can alternatively be used for such supply flights.

Through a further development or expansion of the ATV or the Progress Capsule with a payload return or retrieval container, this provides a further possibility of transporting test sample materials or the like from a spacecraft back to earth, without relying on the Space Shuttle. In this regard, the payload return or retrieval container is installed through the loading hatch into the payload bay of the ATV or the Progress Capsule. After the ATV or Progress Capsule has completed its mission, but before it reenters the earth's atmosphere and burns up, the payload return container is ejected from the payload bay of the spacecraft (ATV or Progress Capsule). The container itself is equipped with a heat shield so that it can reenter the earth's atmosphere and return to earth safely and undamaged.

Such a payload return or retrieval container shall be adapted to return to earth test sample materials or other payloads having a mass up to 360 kilograms. In order to reliably eject such a container out of the transport vehicle or other spacecraft for its return to earth, it is necessary to provide an ejection apparatus that is able to impose on the container a translational or linear velocity on the order of magnitude of approximately 1 m/s. Furthermore, the ejection apparatus must be able to impose a suitable rotational moment on the container about its longitudinal axis, for spin-stabilizing the container.

In the past, a series of different ejection apparatus for ejecting space flying bodies from satellites have been developed. For example, apparatus have been developed for use in so-called spy satellites for the ejection of return capsules carrying exposed film material back to earth. In such applications, the flying bodies to be ejected had relatively small mass and dimensions. Other ejection systems have been developed for the ejection of rotation-axis-stabilized or spin-stabilized communication satellites or miniature satellites from the Space Shuttle. Such communication satellites are space flying bodies having significantly larger dimensions, for example with diameters larger than 2.5 meters and with a comparatively high mass. On the other hand, such so-called miniature satellites are flying bodies having smaller dimensions and accordingly a smaller mass. Similar ejection apparatus have been developed for re-entry capsules having dimensions in a middle range between those of communication satellites and miniature satellites.

The known ejection systems include mechanisms for rotating the flying body to impose a spin stabilization, and accelerating the flying body to impose a translation motion on the flying body. Such apparatus are installed in an ejection bay or tube, and include motors, spring-operated pressure devices, and/or explosive devices, for example. All of the above described conventional ejection systems have a substantial disadvantage of a relatively high weight and a complex construction. This complexity leads to malfunctions or breakdowns that jeopardize the operational reliability of the systems.

SUMMARY OF THE INVENTION

In view of the above, it is an object of the invention to provide an ejection apparatus of the above discussed general type, but which is lighter in weight and simpler in construction and operation, relative to the conventional apparatus, so that it is inherently functionally secure and reliable. Another object of the present invention is to provide such an ejection apparatus that is able to impose an exactly prescribable combination of a translation motion and a rotation motion on the flying body that is to be ejected. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an ejection apparatus for ejecting a spin-stabilized space flying body from a spacecraft. According to the invention, the apparatus includes a first ring element to be secured to the spacecraft, a cable winding device that is arranged on a second ring element and that is releasably engageable with the flying body, and a plurality of tension cables extending between and interconnecting the two ring elements. A first end of each cable is connected to the first ring element, and a second end of each cable is connected to and selectively wound-up on the cable winding device on the second ring element. Thereby, the cables can be selectively wound-up on or extended from the cable winding device. The apparatus further includes, mounted on the first ring element, holding elements adapted to selectively restrain or release the flying body relative to the first ring element, and guide elements adapted to position and guide the flying body relative to the first ring element. The first ring element has an open inner diameter corresponding to or larger than an outer diameter of a portion of the flying body that is to be ejected, to allow this portion to be inserted through the open inner diameter of the first ring element.

Preferably, the cable winding device includes an internally arranged torsion spring such as a coil spring or spiral spring, which spring-loads and rotationally biases a cable winding spool, drum, winch or the like, so as to tend to reel-in and wind-up the tension cables. While the cable winding device is preferably a spring-loaded cable winding device, alternatively the cable winding device can be actively powered by an electric motor or other active power sources rather than being merely spring-loaded. A rotation axis of the winding device preferably coincides with the central axis of the ring elements. The length of each cable preferably corresponds to at least approximately the axial length of the flying body or the relevant portion thereof, for example 75% to 100% of the axial length of the flying body.

In the inventive apparatus, the cable winding device cooperating with the cables serve to simultaneously impose the combined rotation and translation motion onto the flying body for spin-stabilizing and ejecting the flying body from an ejection tube or bay of the spacecraft, in which the apparatus is installed. Thereby, the spring-loaded winding device represents a very effective, simple, reliable, robust and safe drive mechanism for driving both the rotation and the translation motion for the ejection. To achieve this, the apparatus must first be set into a ready or loaded state, in which the two ring elements are axially spaced apart from one another, and the tension cables are paid out from the cable winding device and extend axis-parallel along a cylindrical contour between the two ring elements. Thereby, the torsion spring of the cable winding device is loaded or stressed, i.e. tensioned, and thus exerts a spring bias that tends to retract and wind-up the cables on the cable winding device.

The above described loaded or ready state of the apparatus can be achieved as follows. The payload retrieval container or other flying body to be ejected preferably has a substantially cylindrical configuration, or at least a body portion with a substantially cylindrical configuration. One end of the flying body is inserted through the open inner diameter of the first ring element and then releasably engaged with catch elements of the cable winding device on the second ring element. This can be carried out before or after the two ring elements have been translationally axially separated from one another. In any event, as the two ring elements are separated from one another, the cable winding device and the catch elements thereof rotate about a central axis of the apparatus, as the cables are paid out. Thus, if the flying body has already been inserted and engaged at this time, then the flying body will also have to be rotated along with the cable winding device. When the cables have been paid out, and extend axis-parallel along a cylindrical contour, and particularly along the cylindrical outer circumference of the flying body, between the two ring elements, then the selective holding devices on the first ring element are set into an engaged condition to engage or hold the flying body. The cable winding device is also arrested or locked. The apparatus is now in a loaded and ready but locked state.

To carry out the ejection, the cable winding device is first unlocked, and then the holding devices of the first ring element are released. Thereby, the flying body is released, and the tension of the torsion spring of the cable winding device pulls, retracts and winds-up the tension cables onto (i.e. into) the cable winding device. This retraction of the cables pulls the second ring element (and therewith the flying body seated thereon) toward the first ring element, whereby the flying body is ejected axially translationally outwardly through the open inner diameter of the first ring element. Simultaneously, a rotating body portion and associated catch elements of the cable winding device rotate and transmit this rotational motion and resulting torque onto the flying body due to the engagement of the catch elements with receivers on the bottom or aft end of the flying body. Thereby, the flying body is rotated for spin-stabilization thereof as it is translationally ejected outwardly through the first ring element and out of the ejection bay or tube of the spacecraft.

The construction and operation of the apparatus according to the invention provides several advantages compared to conventional ejection apparatus. A very important advantage is the exclusion and avoidance of explosive devices or materials for ejecting the flying body, which thereby eliminates a considerable safety risk for the astronauts and for the spacecraft itself. Furthermore, the inventive apparatus minimizes the weight and volume of the mechanisms for achieving the spin-stabilization as well as the translational motion for the ejection, which thereby minimizes the total mass and volume of the overall space flight system. This in turn allows the available or usable payload mass and payload volume to be maximized. Still further, a reduction of the number of required mechanical and electrical functional components achieves a reduction of the complexity of the ejection mechanism, and therewith also an increase of the reliability and efficiency of the apparatus. When the cable winding device is preferably embodied as a cable spool or winch that is spring-loaded with a torsion spring as a drive element, the inventive apparatus does not need electrical energy for driving the ejection process. Thus, there is no need to provide high-current electrical supplies from the flying body to be ejected or from the spacecraft, so that any on-board electrical power supply system can be correspondingly simplified and reduced in capacity and weight. Also, the exact ratio or relationship between the rotation motion and the translation motion for the ejection can be selected simply by providing a suitable diameter of the cable winding spool or winch. In other words, a cable winding spool having a different diameter will provide a different ratio of rotation relative to translation for the ejection. The apparatus is thus easily adaptable to different ejection requirements.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
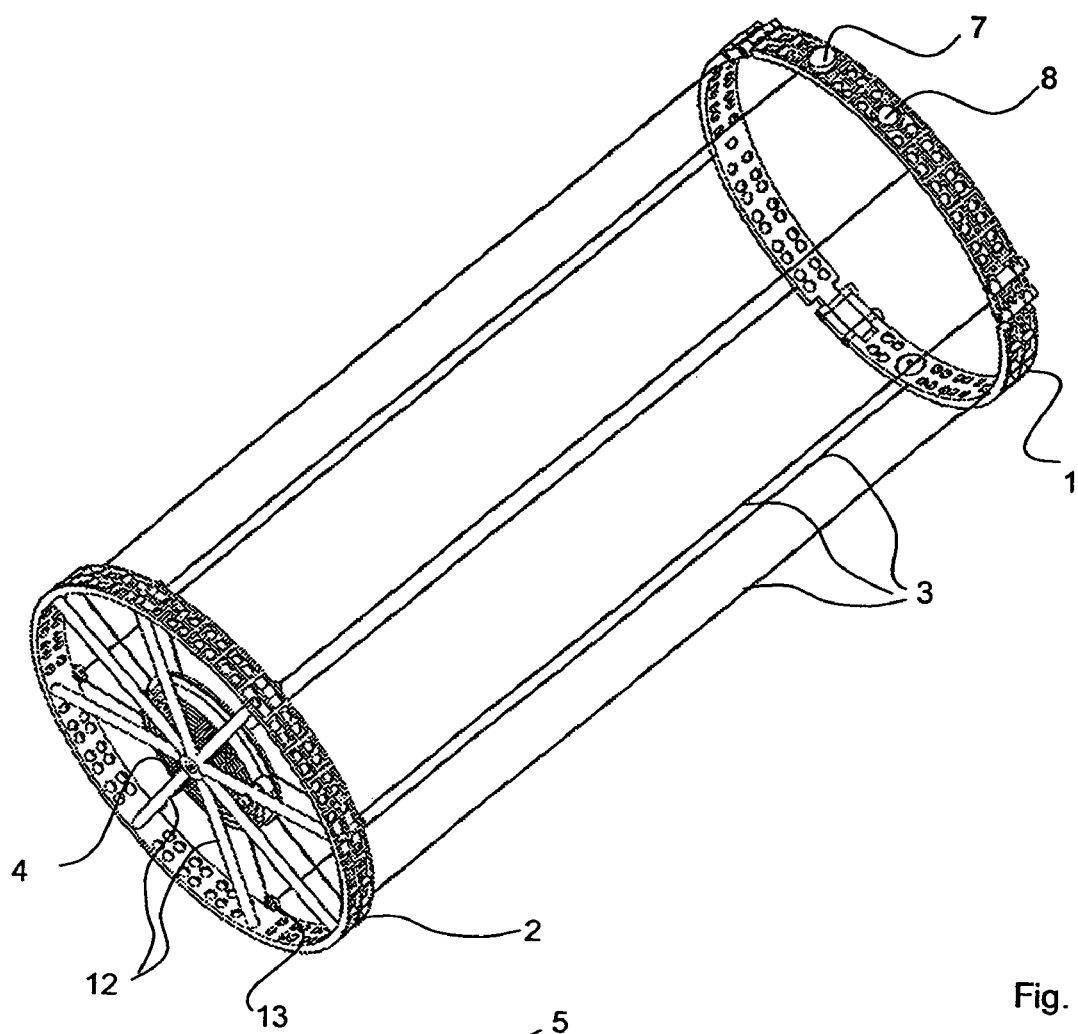
FIG. 1 is a schematic perspective overview of an ejection apparatus according to the invention, in a tensioned state, but without a flying body that is to be ejected, arranged therein.
Figure 2:
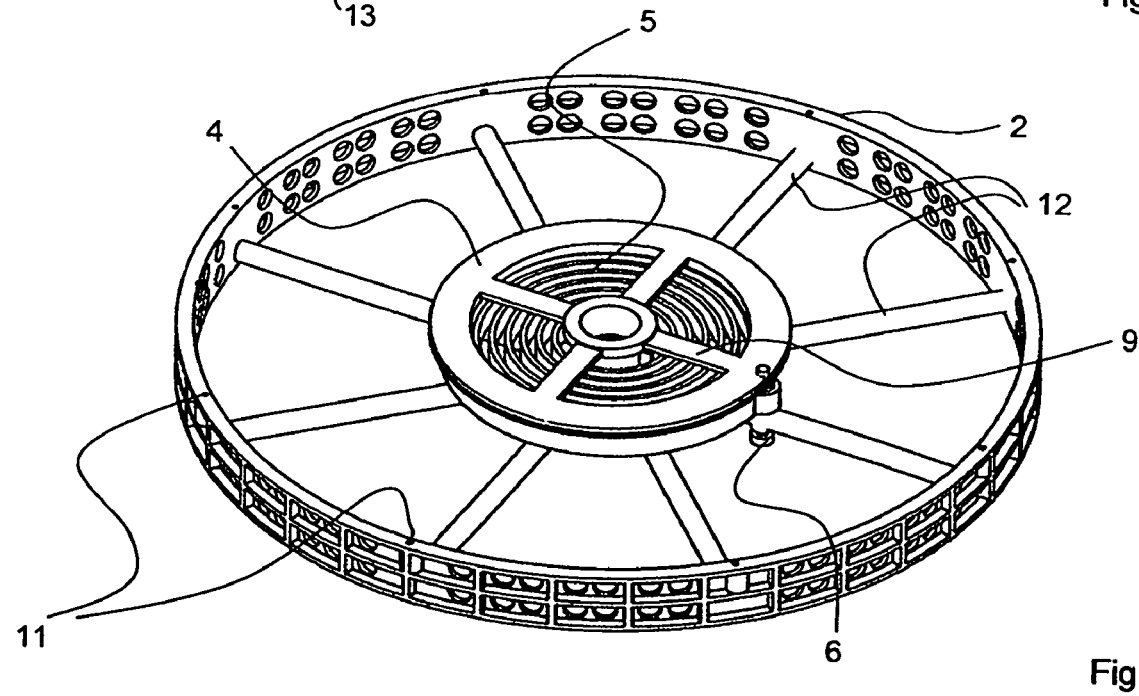
FIG. 2 is a perspective detail view of the second ring element and cable winding device of the apparatus according to FIG. 1.
Figure 3:
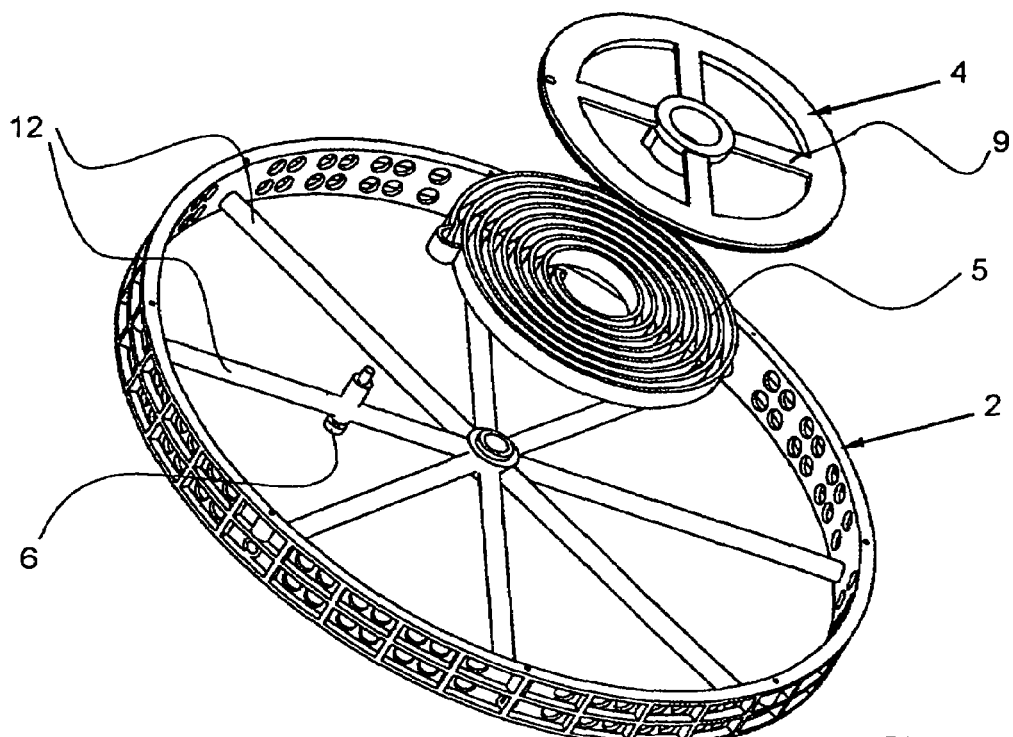
FIG. 3 is a perspective exploded view of components of the cable winding device according to FIG. 2.

FIG. 1 shows an ejection apparatus according to an example embodiment of the invention. The ejection apparatus essentially comprises a first ring element 1, a second ring element 2, and a plurality of tension cables 3 extending between and interconnecting the two ring elements 1 and 2. In the present embodiment, the apparatus includes a total of eight such tension cables 3. The tension cables may be structurally embodied as any type of cable, rope, wire, fiber, or the like, of synthetic fiber materials or of metal or of other suitable materials, but are preferably embodied as metal wire cables, e.g. steel wire cables. The ring elements 1 and 2 may be constructed of metal, fiber reinforced composite material, or other suitable materials.

The apparatus further comprises a cable winding device 4 such as a cable winding spool, drum, winch, or the like. The cable winding device 4 is equipped with an internally arranged torsion spring 5 such as a coil spring or spiral spring, which spring-loads or torsionally biases the cable winding device 4 so as to reel-in and wind-up the tension cables 3. One end of the spring is connected to (e.g. a spoke 12 of) the second ring element 2, and the other end of the spring is connected to the spool or drum of the winding device 4. The cable winding device 4 is further equipped with a locking pin 6 that is selectively actuatable or operable to selectively arrest and block or release and unblock the cable winding device 4, so as to prevent or enable the winding rotation thereof.

The cable winding device 4 or particularly the spool or drum thereof is rotatably supported on a central hub that is connected via spokes 12 to the second ring element 2, so that the rotation axis of the winding device 4 coincides with the central axis of the ring element 2 and that of the aligned ring element 1. A first end of each tension cable 3 is secured to the first ring element 1, and a second end of each tension cable 3 is secured to and selectively wound-up on the cable winding device 4 mounted on the second ring element 2. The cables 3 are each deflected on respective deflection devices 13 such as deflection pulleys or low-friction slide blocks, from an axial direction to a radial direction extending to the winding device 4. The deflection devices 13 are secured to mounting points 11 such as eyelets or bolt holes provided at the perimeter of the second ring element 2.

The inventive apparatus still further comprises a plurality of electrically or electromagnetically actuatable holding devices 7, for example preferably embodied as electrical actuators or solenoids 7, arranged distributed (preferably uniformly or equidistantly) around the circumference of the first ring element 1. The apparatus still further comprises guide elements 8 that serve to position and guide the flying body 10 within an open or clear inner diameter of the first ring element 1. In this regard, the guide elements 8 are preferably embodied as roller balls 8 that are freely rotatably supported in ball sockets and are mounted (preferably uniformly) distributed about the circumference of the second ring element 2. Particularly, in the preferred illustrated embodiment, there are two magnetic solenoids 7 and two roller balls 8 arranged respectively diametrically opposite one another on the first ring element 1.

A plurality of catch elements 9, e.g. four of the catch elements 9 in the present example embodiment, are arranged uniformly distributed about the circumference of the cable winding device 4. For example, the catch elements may be radially extending spokes 9 of the winding device as shown, or alternatively may be embodied as protruding pins, dogs, holes, recesses or the like. These catch elements 9 will releasably engage corresponding mating receivers 14, such as receiver recesses 14, provided on an end 10C of the flying body 10, for example as shown in FIGS. 4 and 6.

Figure 4:
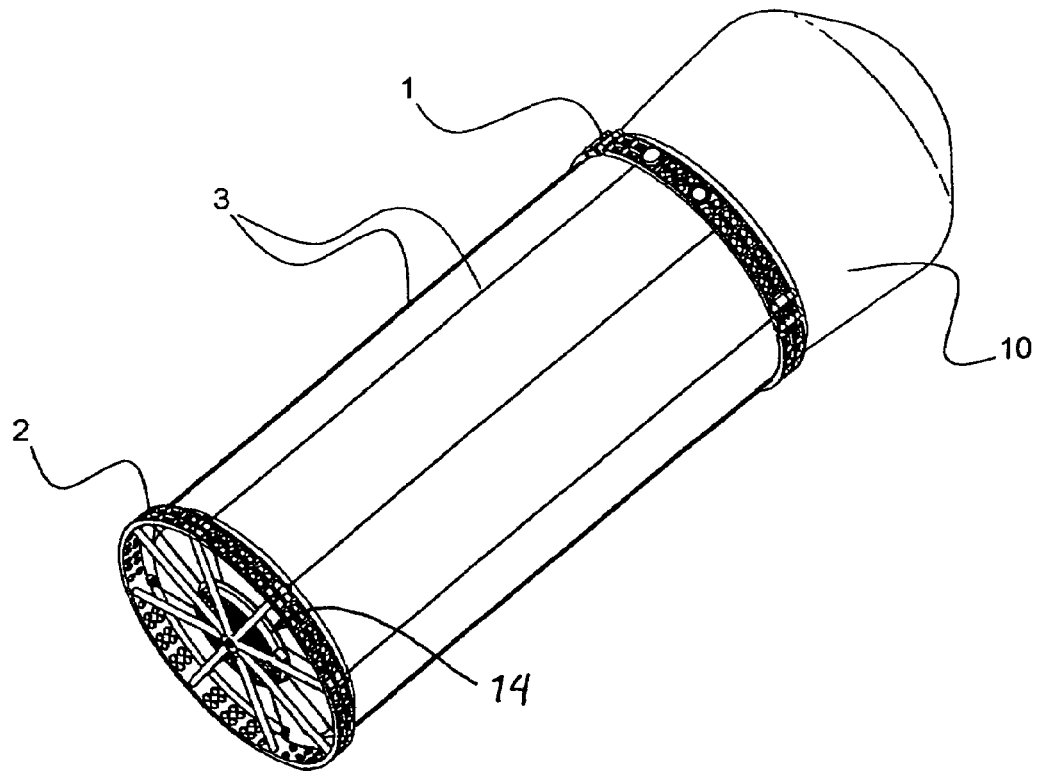
FIG. 4 is a perspective view of the apparatus according to FIG. 1, after the insertion of the flying body to achieve the loaded or ready state.
Figure 5:
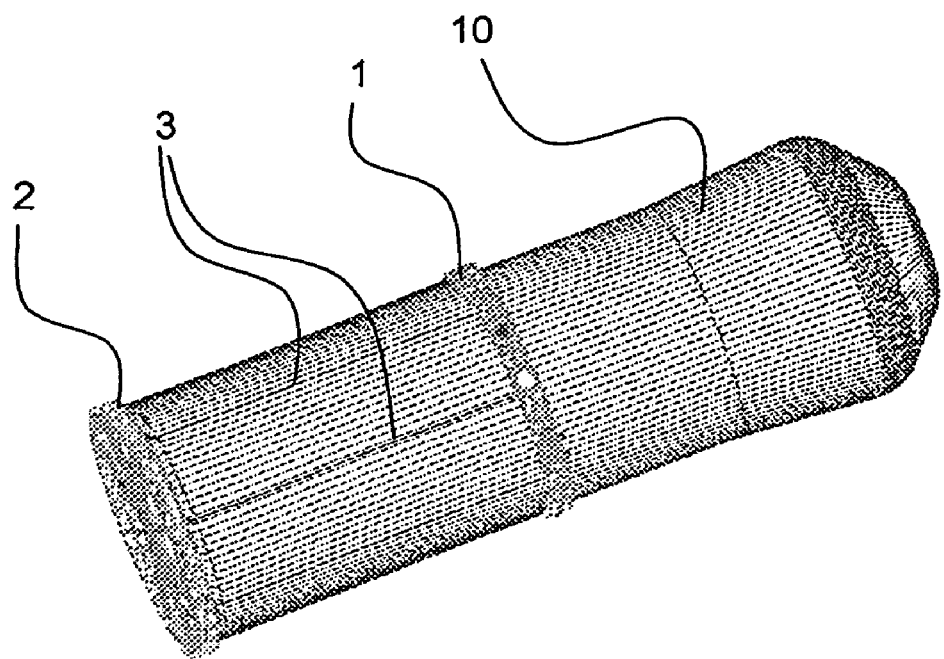
FIG. 5 is a perspective view of the apparatus according to FIG. 4, during the ejection of the flying body.
Figure 6:
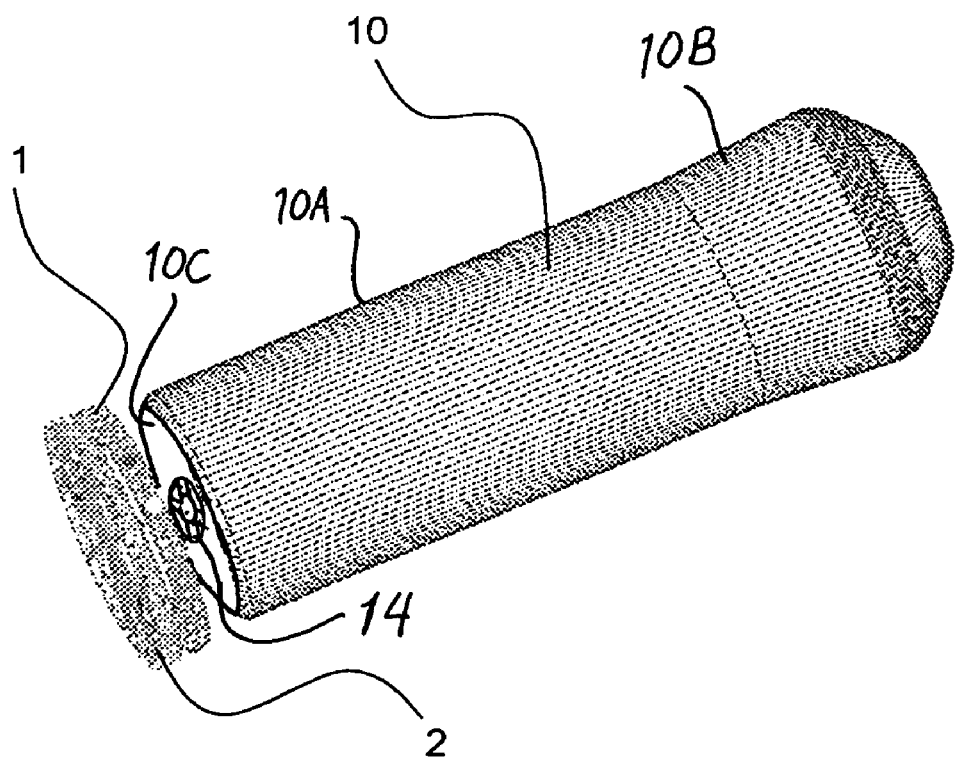
FIG. 6 is a perspective view of the apparatus according to FIG. 5, immediately after the complete ejection of the flying body, i.e. after the separation of the flying body from the apparatus.

The flying body 10, such as a payload retrieval container that is to be ejected, has a substantially cylindrical basic shape, or at least a body portion 10A having a substantially cylindrical basic shape, as shown in FIGS. 4 to 6. In the present example, the forward end portion (as seen in the forward flight direction) of the flying body 10 has a slightly expanded or wider nosecone section 10B. The outer diameter of the cylindrical body portion 10A of the flying body 10 is selected to essentially match or be slightly smaller than the clear open inner diameter of the first ring element 1. In this regard, a small clearance gap between the inner diameter of the first ring element 1 and the outer diameter of the cylindrical body portion 10A of the flying body 10 allows the cylindrical body portion 10A to pass freely in and out through the first ring element 1, while being contacted, positioned and guided by the rolling roller balls 8 that act as ball bearings, while allowing the flying body 10 to move rotationally and translationally relative to the first ring element 1. The diameter of the flying body 10 is also generally matched to the diameter of the second ring element 2 (being the same as, slightly smaller than, or slightly larger than the diameter of the second ring element 2). In this regard, it is simply necessary that the catch elements 9 provided on the cable winding device 4 must contact and releasably engage the receivers 14 (e.g. receiver recesses 14) provided at the rear end 10C of the flying body 10, as shown in FIGS. 4 and 6.

FIG. 1 shows a tensioned or ready condition of the apparatus, without having the flying body 10 yet installed or inserted therein. FIG. 4 shows the ready and loaded condition, in which the flying body 10 has been inserted into the inventive apparatus. In this condition, the two ring elements 1 and 2 have been axially separated from one another, thereby paying out the tension cables 3 from the cable winding device 4, whereby the cable winding device 4 is rotated, and the torsion spring 5 thereof is brought into a stressed or tensioned condition. The spring 5 thus exerts a rotational bias on the spool, drum or winch of the cable winding device 4, tending to retract or wind-up the cables 3 onto or into the cable winding device 4. At this time, or later during the loading or readying process, the locking pin 6 is activated or engaged so as to arrest the cable winding device 4 to prevent a winding retraction of the cables 3.

At this time (or earlier), the cylindrical body portion 10A of the flying body 10 is inserted through the open inner diameter of a first ring element 1, so that the bottom or aft end 10C of the flying body 10 is seated onto the second ring element 2, and particularly so that the catch elements 9 of the cable winding device 4 become releasably engaged with corresponding receivers such as receiver recesses or grooves 14 on the end 10C of the flying body 10. While the flying body 10 is being inserted, the magnetic actuators or solenoids 7 remain retracted or disengaged, so that the flying body 10 can move freely relative to the first ring element 1, and the roller balls 8 properly centrally position, moveably support, and guide the flying body 10 within the inside of the first ring element 1, particularly to position the flying body 10 coaxially along the central axis of the apparatus.

After the finished loaded or ready condition shown in FIG. 4 is achieved, the magnetic actuators or solenoids 7 are extended and engaged in order to hold or arrest the flying body 10 relative to the first ring element 1. Then, the locking pin 6 may be removed, released or disengaged so as to release the cable winding device 4, so that the tension of the torsion spring 5 rotationally biases the cable winding device 4 and places the cables 3 under tension. The apparatus is then in a ready and loaded condition.

In the final ready condition as described above and shown in FIG. 4, or at any earlier point in the process described above, the inventive apparatus (with or without the inserted flying body) is mounted and installed in a corresponding mount arrangement, such as an ejection tube or bay, inside the spacecraft, for example the ATV or the Progress Capsule, from which the flying body 10 is to be ejected. The spacecraft and its ejection tube or bay are not illustrated, but can involve any spacecraft structure from which the flying body is to be ejected. In any event, the first ring element 1 is secured to the structure of the spacecraft, while the second ring element 2 is not.

Once the loaded or ready condition has been achieved, the launch or ejection process can be initiated whenever desired (after removing or disengaging the locking pin 6 of the cable winding device 4) by retracting or disengaging the magnetic solenoids 7, whereby the flying body 10 is released relative to the first ring element 1. The pre-tensioned torsion springs 5 act on the cable winding device 4 so as to pull-in and wind-up the tension cables 3. Thereby, the rotation of the cable winding device 4 is imparted to the flying body 10 via the catch elements 9 engaging the receivers 14, and simultaneously the cables 3 pull the second ring element 2 axially toward the first ring element 1. Thereby, the flying body 10 is simultaneously rotated and translationally moved outwardly through the first ring element 1, as shown in FIG. 5. The combination of the rotation and translation motion of the flying body 10 relative to the first ring element 1, which is secured to the spacecraft, achieves the rotational spin-stabilization and ejection of the flying body 10 out of the spacecraft, as shown in FIG. 6. The spin-stabilized flying body 10 can then return to earth, for example.

FIG. 6 shows the condition or state of the flying body 10 and the inventive apparatus immediately after the flying body 10 has left the two ring elements 1 and 2. Note that the catch elements 9 of the cable winding device 4 have become disengaged or released from the receiver recesses 14 on the rear end 10C of the flying body 10, so as to freely release the flying body 10 from the apparatus. In this state shown in FIG. 6, the tension cables 3 are retracted into the cable winding device 4, and the two ring elements 1 and 2 are essentially contacting or immediately adjacent one another. From this state, the inventive apparatus can be repeatedly reloaded to the ready condition shown in FIGS. 1 and 4, and reused for ejecting another flying body, if applicable. For example, the reuse of the inventive apparatus would apply if the spacecraft is a reusable space transport vehicle such as the Space Shuttle. On the other hand, if the spacecraft is a single-use spacecraft that is destroyed upon reentry into the earth's atmosphere, then the inventive apparatus will also be lost with the spacecraft. This is not a substantial disadvantage, because the simple inventive apparatus is also comparatively quite economical and thus suitable for single-use applications.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for ejecting a spin-stabilized flying body from a spacecraft, said apparatus comprising:
    a first ring element to be secured to the spacecraft, wherein said first ring element has an open inner diameter corresponding to or larger than an outer diameter of a portion of the flying body to allow the portion to be inserted through said open inner diameter of said first ring element;
    a second ring element;
    a cable winding device that is arranged on said second ring element and that is releasably engageable with the flying body;
    a plurality of tension cables extending between and interconnecting said first and second ring elements, wherein each respective one of said tension cables has a respective first cable end thereof connected to said first ring element and a respective second cable end thereof connected to and selectively wound-up on said cable winding device arranged on said second ring element;
    a plurality of holding elements mounted on said first ring element and adapted to selectively hold the flying body; and
    a plurality of guide elements mounted on said first ring element and adapted to position and guide the flying body within said open inner diameter of said first ring element.

2. The apparatus according to claim 1, including only a single said cable winding device, and wherein said respective second cable ends of all of said tension cables in common are connected to and selectively wound-up on said single cable winding device.

3. The apparatus according to claim 1, wherein all of said tension cables extend parallel to each other and parallel to a central axis of said ring elements between said first and second ring elements.

4. The apparatus according to claim 1, wherein each one of said tension cables has a length corresponding to 75% to 100% of an axial length of the flying body.

5. The apparatus according to claim 1, wherein said plurality of tension cables includes a total of exactly eight of said tension cables.

6. The apparatus according to claim 1, wherein said tension cables are uniformly distributed and spaced apart from one another around a circumference of said first ring element and a circumference of said second ring element.

7. The apparatus according to claim 1, wherein said tension cables are metal wire cables.

8. The apparatus according to claim 1, wherein said tension cables provide the only interconnection between said first and second ring elements.

9. The apparatus according to claim 1, wherein said cable winding device has a winding rotation axis that coincides with a central axis of said ring elements.

10. The apparatus according to claim 9, wherein said cable winding device comprises a rotatable body that is rotatable about said winding rotation axis, and catch elements that are connected to and rotatable with said rotatable body about said winding rotation axis and that are exposed, positioned and configured to releasably engage receivers of the flying body.

11. The apparatus according to claim 1, wherein said cable winding device is a spring-loaded cable winding device.

12. The apparatus according to claim 1, wherein said cable winding device comprises no active powered drive.

13. The apparatus according to claim 1, wherein said cable winding device comprises a cable winding spool rotatably arranged about a center of said second ring element, and a torsion spring connected to and rotationally biasing said cable winding spool.

14. The apparatus according to claim 13, wherein said cable winding device further comprises a locking pin arranged and adapted to selectively lock and release a cable winding rotation of said cable winding spool.

15. The apparatus according to claim 1, further comprising a plurality of cable deflection devices arranged distributed around a perimeter of said second ring elements, wherein said tension cables respectively deflect over said cable deflection devices, from whence said respective second cable ends of said tension cables extend to said cable winding device.

16. The apparatus according to claim 1, wherein said holding elements comprise selectively actuatable magnetic actuators or solenoids.

17. The apparatus according to claim 1, wherein said guide elements comprise roller balls that are freely rotatably supported in ball sockets and that face radially inwardly in said open inner diameter of said first ring element.

18. The apparatus according to claim 1, wherein said cable winding device is spring-loaded by a torsion spring, and said apparatus is selectively configurable in a loaded state and an unloaded state, wherein:

in said loaded state, said first and second ring elements are axially displaced apart from one another, said tension cables are paid out of said cable winding device and respectively extend axis-parallel along a cylindrical contour between said first and second ring elements, and said torsion spring is stressed in a loaded spring condition; and in said unloaded state, said first and second ring elements are contacting one another or immediately close together, said tension cables are wound-up in or on said cable winding device, and said torsion spring is relaxed to an unloaded spring condition of lower spring stress than said loaded spring condition.

19. The apparatus according to claim 1, expressly excluding all explosive devices and explosive materials.

20. A spacecraft system comprising a spacecraft having an ejection bay, a flying body that is received in said ejection bay and that is to be ejected in a spin-stabilized manner out of said ejection bay, and an ejection apparatus that is arranged in said ejection bay and that is adapted to eject said flying body with a translation motion and a rotation motion out of said ejection bay, wherein said ejection apparatus comprises:

a first ring element secured to the spacecraft, wherein said first ring element has an open inner diameter corresponding to or larger than an outer diameter of a portion of said flying body, which is received in and extends through said open inner diameter;

a second ring element;

a cable winding device arranged on said second ring element;

a plurality of tension cables extending between and interconnecting said first and second ring elements, wherein each respective one of said tension cables has a respective first cable end thereof connected to said first ring element and a respective second cable end thereof connected to said cable winding device arranged on said second ring element;

a plurality of holding elements mounted on said first ring element and releasably holding said flying body; and a plurality of guide elements mounted on said first ring element and positioning and guiding said flying body within said open inner diameter of said first ring element;

wherein said tension cables extend parallel to each other and parallel to a central axis of said ring elements between said first and second ring elements; and wherein said cable winding device comprises a rotatable body that is rotatable about a winding rotation axis that coincides with a central axis of said ring elements and of said flying body, and catch elements that are connected to and rotatable with said rotatable body about said winding rotation axis and that are releasably engaged with receivers of said flying body.

* * * * *